H. B. LAYMAN.
CONNECTING ROD.
APPLICATION FILED MAR. 26, 1918.

1,340,172.

Patented May 18, 1920.

Herbert Bernard Layman INVENTOR.

UNITED STATES PATENT OFFICE.

HEBRON BERNARD LAYMAN, OF NEW YORK, N. Y., ASSIGNOR TO THE LAYMAN PRESSED ROD COMPANY, INC., OF NEW YORK, N. Y., A CORPORATION OF NEW YORK.

CONNECTING-ROD.

1,340,172.   Specification of Letters Patent.   Patented May 18, 1920.

Application filed March 26, 1918. Serial No. 224,759.

*To all whom it may concern:*

Be it known that I, HEBRON BERNARD LAYMAN, a citizen of the United States, and residing at New York, in the county of New York and State of New York, have invented certain new and useful Improvements in Connecting-Rods, of which the following is a specification, such as will enable those skilled in the art to which it appertains to make and use the same.

This invention relates to connecting rods, pitman rods, links, levers and the like, when fashioned from thin material, generally tubing or sheet metal—ferrous or non-ferrous—whether of many pieces or one piece, and whether jointed or jointless.

An object of the invention is to provide a light-weight connecting rod or the like, especially suitable for slow speed "heavy-duty" service, such, for instance, as in Diesel engines, or, in fact, for any service where the rod is subjected to extremely high pressures, when the crank pin is upon the upper dead center. In this condition the rod is as a beam with two fixed ends in compression, thus presenting its greatest deflection at a point midway the shank section. It should be clearly understood that in connecting rods for high speed type engines, the line of maximum deflection is nearer the crank head end than is shown in the accompanying drawing, due to the centrifugal force of the mass about the crank pin center. The invention may, however, be applied with great profit to high speed engines. This object is accomplished by the provision of a shell, preferably a unitary shell, the wall of which is of varying or tapering thickness, allowing the use of thicker material in the more heavily stressed portions of the shell, thinner material in the lightly stressed portion or portions, and material of tapering thickness joining the thicker and thinner sections.

Other objects will appear hereafter in the specification and claims, clearly discernible to those skilled in this art.

Certain features of my invention are claimed broadly in my co-pending application Serial No. 224,758.

In the accompanying drawing, by way of example only, the invention is shown as applied to the one-piece, jointless, hollow connecting rod shell, which is the subject of my co-pending application, Serial No. 91,566, filed April 17th, 1916, and the rod of this present invention as shown, is fabricated entirely and solely by the process fully described and shown in my co-pending application, Serial No. 93,052, filed April 24th, 1916, entitled "Method of making connecting rods."

The invention may, with equal facility, be applied to other forms of connecting rods fashioned from relatively thin material, for example the rods disclosed in my co-pending applications, Serial Numbers—

157,273 filed March 24th, 1917,
161,399   "   April 12th,   "
161,729   "   April 13th,   "
162,727   "   April 17th,   "

or to those rods which are the subject matter of the United States patents issued to me, Nos. 1,176,300, 1,176,302, 1,218,572 and 1,226,978.

Figure 1:
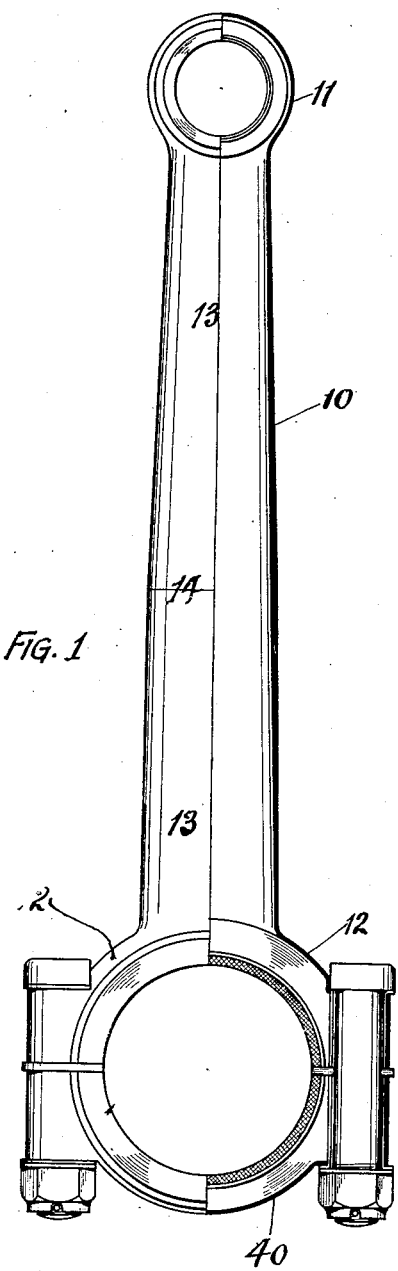
Figure 1 is a side elevation, half in section, of a connecting rod, having a one piece sheet metal shell, embodying the feature of the invention.
Figure 2:
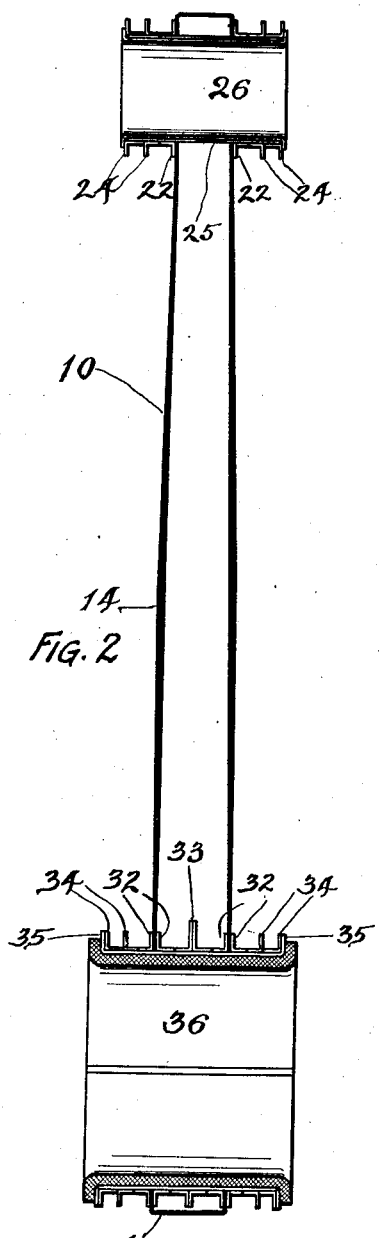
Fig. 2 is a section at right angles of the rod of Fig. 1.

10 is the shell of the connecting rod, comprising a piston end portion 11 and a crank end portion 12, both of relatively thin material, which are connected by an integral shank portion 13 which tapers from each end toward the center 14, where it attains its maximum thickness. If the rod be considered as a beam in axial compression, the line 14 will denote the zone of greatest deflection, hence the tapering of the wall thickness of the shank portion from each end toward this line, is theoretically and practically correct, resulting in the lightest rod possible for that given condition.

At the piston pin end and to the sides of the rod shell are welded flanged bushings 22, and abutting these are other flanged bushings 24. Within all of these is a ferrule 25, which in turn is lined with a bearing metal bushing 26. The detailed construction of this piston end of the rod is described and claimed in my co-pending applications, Serial Numbers—

159,398, filed April 3rd, 1917.
170,416,   "   May 23rd,   "

At the crank head end, the crank pin boss is formed principally of flanged bushings 32, secured to both the inner and the outer surfaces of the shell, and other flanged bushings 33 and 34, within all of which is a flanged ferrule 35, which in turn is lined with a Babbitt or other bearing metal lining 36.

40 is the cap, which, as described in my co-pending applications, Serial Numbers 91,566 and 93,052, may be formed integral with the shell, and subsequently cut therefrom.

In my application entitled "Method of making connecting rods," previously referred to, Serial No. 93,052, I have, at great length, described and shown all of the steps of the process of making the connecting rod of this present invention.

Heretofore, I have used the word "shell" in referring to the main part of the connecting rod. By "shell" I means the shank portion and one or both end portions integral therewith, exclusive of cap or flanged bushings, or liner bushing, or bolt boss bushings, or shank reinforcement, or similar small parts. My use of the word "shell" will apply with equal force to connecting rods with or without caps.

Where I use the term "sheet metal" hereinafter in the claims, I wish it understood that I mean any form of metal which partakes of the nature and characteristics of sheet metal, as distinguished from castings and forgings.

As distinguished from the present invention, in which the rod shell has an end portion or end portions of lesser thickness than the shank portion, I have described and claimed in my co-pending application No. 224758 a connecting rod shell having end portions of greater thickness than the shank portion, and in my co-pending application No. 224,760, I have described and claimed a connecting rod shell with one end portion of greater and one of lesser thickness than the shank portion.

Having fully described my invention, what I claim as new and desire to secure by Letters Patent, is:—

1. A sheet metal connecting rod shell with end portions of lesser thickness than the shank portion.

2. A one-piece sheet metal connecting rod shell, with an end portion of lesser thickness than the shank portion.

3. A sheet metal connecting rod shell having an end portion of lesser thickness than the shank portion.

4. A sheet metal connecting rod shell with a shank portion, the wall of which tapers in thickness from the center toward both ends.

5. A connecting rod having a one piece sheet metal shell, with a shank portion, the wall of which tapers in thickness from the center toward both ends.

6. A sheet metal connecting rod shell, having a longitudinally jointless tubular shank, the wall of which increases in thickness from each end.

7. A sheet metal connecting rod shell, with an end portion of relatively thin metal, and a shank portion which increases in wall thickness from the said end portion.

8. A sheet metal connecting rod shell with a shank portion, which is of increased wall thickness in the region subject to heaviest stresses.

9. A sheet metal connecting rod shell with a shank portion, which, near the middle, is of increased wall thickness.

10. A sheet metal connecting rod shell having thin metal ends, and a shank portion of increased wall thickness in a region distant from the ends.

11. A sheet metal connecting rod shell, which decreases in wall thickness toward the piston end.

12. A sheet metal connecting rod shell, which decreases in wall thickness toward the crank end.

13. A sheet metal connecting rod shell, which decreases in wall thickness toward both ends.

14. A connecting rod shell formed from a single piece of relatively thick sheet metal, and having an integral thin metal head end.

15. A connecting rod shell formed from relatively thick sheet metal, and having integral thin metal ends.

16. A sheet metal connecting rod shell, having a comparatively thick wall in its heavily stressed section or portion, and a relatively thin wall in the zone of comparatively light stresses.

17. A sheet metal connecting rod shell, the wall of which varies in thickness in different portions thereof, approximately according to the stresses imposed thereupon, being thinner in the lightly stressed portions, and relatively thicker in the heavily stressed portions.

HEBRON BERNARD LAYMAN.

Witnesses:
 M. C. MEYER,
 L. D. WISE.